United States Patent
Tsai et al.

(10) Patent No.: US 7,886,984 B2
(45) Date of Patent: Feb. 15, 2011

(54) METHOD OF UTILIZING AIR CONDITIONER TO CONTROL THERMAL COMFORT LEVEL OF ENVIRONMENT

(75) Inventors: Kun-Cheng Tsai, Taipei (TW); Wei-Jyun Tu, Taipei (TW)

(73) Assignee: Institute for Information Industry, Taipei (TW)

( * ) Notice: Subject to any disclaimer, the term of this patent is extended or adjusted under 35 U.S.C. 154(b) by 642 days.

(21) Appl. No.: 11/959,480

(22) Filed: Dec. 19, 2007

(65) Prior Publication Data

US 2009/0159717 A1  Jun. 25, 2009

(51) Int. Cl.
F24F 11/00 (2006.01)
(52) U.S. Cl. .................. 236/44 C; 236/91 C; 62/176.6; 62/176.1
(58) Field of Classification Search ............... 236/44 C, 236/91 C; 62/176.1, 176.6
See application file for complete search history.

(56) References Cited

U.S. PATENT DOCUMENTS

| | | | | |
|---|---|---|---|---|
| 4,873,649 A | * | 10/1989 | Grald et al. ................ 700/276 |
| 5,170,935 A | * | 12/1992 | Federspiel et al. ........ 236/44 C |
| 5,285,959 A | * | 2/1994 | Nanba et al. ................... 236/11 |
| 7,757,504 B2 | * | 7/2010 | Yonezawa et al. .......... 62/176.6 |
| 2007/0107450 A1 | * | 5/2007 | Sasao et al. ..................... 62/185 |
| 2007/0138307 A1 | * | 6/2007 | Khoo ......................... 236/1 C |

FOREIGN PATENT DOCUMENTS

| JP | H593539 A | 4/1993 |
|---|---|---|
| JP | 200035242 A | 2/2000 |
| TW | 471617 | 1/2002 |

OTHER PUBLICATIONS

Tseng-Yuan Hung, The Investigation and Analysis of Indoor Environmental Quality in a Lecture Theater, Dissertation for Master of Philosophy, Jan. 19, 2004, pp. 1,7,8,14,16,27,28, Department of Environmental Engineering and Management, Chaoyang University of Technology, Taichung, Taiwan, Abstract.

* cited by examiner

*Primary Examiner*—George Nguyen
(74) *Attorney, Agent, or Firm*—Winston Hsu; Scott Margo

(57) ABSTRACT

The present invention provides a method of utilizing an air conditioner to control a thermal comfort level of an environment, wherein the air conditioner includes a plurality of environment factor adjusting devices. The method of the present invention reduces energy consumption of the air conditioner when utilizing the air conditioner to improve the thermal comfort level of an environment.

6 Claims, 2 Drawing Sheets

METHOD OF UTILIZING AIR CONDITIONER TO CONTROL THERMAL COMFORT LEVEL OF ENVIRONMENT

BACKGROUND OF THE INVENTION

1. Field of the Invention

The present invention relates to a method of utilizing an air conditioner including a plurality of environmental factor adjusting devices to control thermal comfort level of an environment, and more particularly, to a method of controlling an environment thermal comfort level which can attain an optimal energy saving goal.

2. Description of the Prior Art

International standards ISO 7730 and ASHRAE 55 both use predicted mean vote (PMV) index and predicted percent dissatisfied (PPD) to describe and estimate thermal comfort level of an environment. The PMV index represents feelings about the temperatures of most people in the same environment, and the PPD index represents a percentage of people unsatisfied with the environment. In addition, please note that the PMV-PPD index comprehensively considers six factors of human activity level, clothing thermal resistance, air temperature, average radiation temperature, air velocity and air humidity. Please refer to FIG. 1. FIG. 1 is a diagram of a relation between the PMV index and the PPD index.

In current buildings, most thermal comfort level control system mainly adjusts the temperature or humidity individually without considering comprehensive estimation of the thermal comfort level, as well as other factors that can affect the thermal comfort level. Thus, when the temperature is adjusted to an ideal level, it is possible that people still feel uncomfortable since the effects of the air velocity and air humidity are not considered.

In addition, since the conventional thermal comfort level control system only considers a single factor (such as the temperature or humidity), improvements to the air conditioner can only focus on Energy Efficiency Ratio (EER), and improvements to the dehumidifier can only focus on Efficiency Factor (EF). Thus, using the conventional thermal comfort level control system will consume more energy in general.

SUMMARY OF THE INVENTION

It is therefore one of the objectives of the present invention to provide a method of utilizing an air conditioner including a plurality of environment factor adjusting devices to control a thermal comfort level of an environment to solve the above problems.

In accordance with an embodiment of the present invention, a method of utilizing an air conditioner to control a thermal comfort level of an environment is disclosed, wherein the air conditioner includes a plurality of environment factor adjusting devices. The method includes determining whether enter an energy saving mode. When entering the energy saving mode, the method performs the following steps: (a) generating a target predicted mean vote (PMV) value according to an input signal; (b) detecting a plurality of environment factors of the environment at present to generate a PMV value as a current thermal comfort level detecting value; (c) obtaining a plurality of PMV-EER values respectively corresponding to the environment factor adjusting devices according to a difference value between the target PMV value and the current thermal comfort level detecting value; (d) determining which one of the environment factor adjusting devices has a greatest PMV-EER value, and choosing it to perform an adjusting operation for the thermal comfort level of the environment; (e) calculating a PMV value of the environment after the adjusting operation is performed to update the current thermal comfort level detecting value; (f) determining whether a difference value of the current thermal comfort level detecting value and the target PMV value is smaller than a predetermined threshold value; and (g) when the difference value of the current thermal comfort level detecting value and the target PMV value is not smaller than the predetermined threshold value, repeating steps (c), (d), (e), and (f) until the difference value of the current thermal comfort level detecting value and the target PMV value is smaller than the predetermined threshold value.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and the claims to refer to particular system components. As one skilled in the art will appreciate, manufacturers may refer to a component by different names. This document does not intend to distinguish between components that differ in name but not differ in function. In the following discussion and in the claims, the terms "include", "including", "comprise", and "comprising" are used in an open-ended fashion, and thus should be interpreted to mean "including, but not limited to . . . ".

Figure 1:
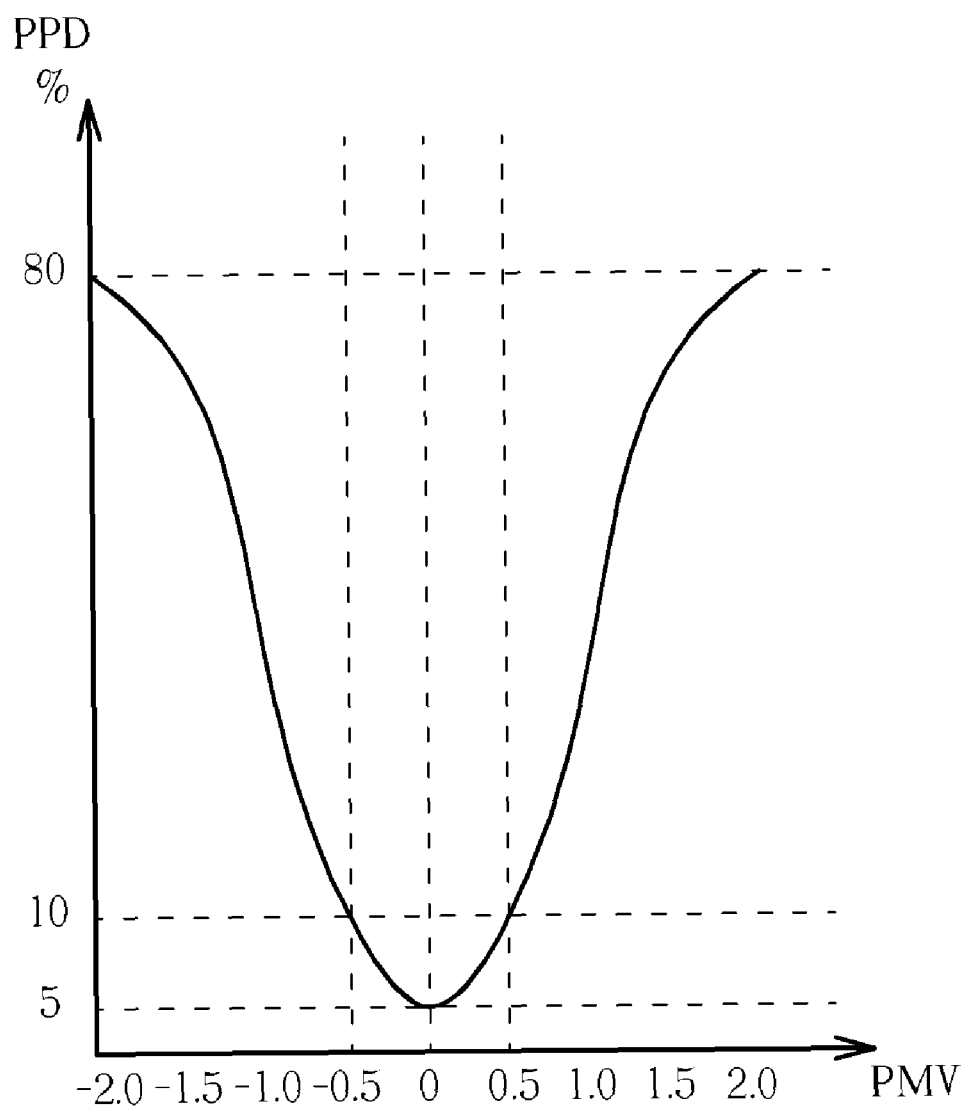
FIG. 1 is a diagram of relation between the PMV index and the PPD index.
Figure 2:
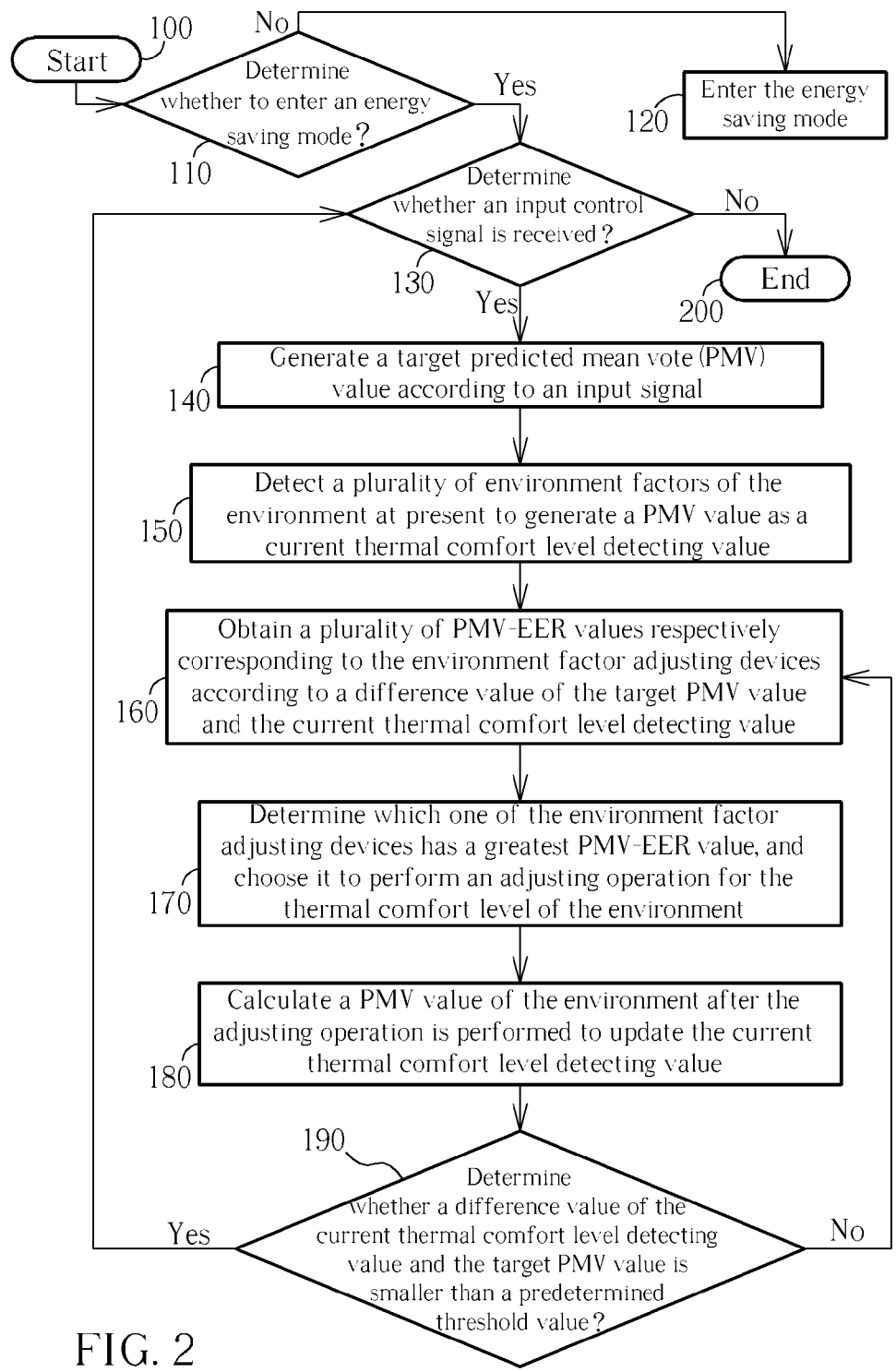
FIG. 2 is a flowchart showing an embodiment of a method of utilizing an air conditioner to control a thermal comfort level of an environment according to the present invention.

Please refer to FIG. 2. FIG. 2 is a flowchart showing an embodiment of a method of utilizing an air conditioner to control a thermal comfort level of an environment according to the present invention, wherein the air conditioner includes a plurality of environment factor adjusting devices. For example, the environment factor adjusting devices can include a temperature adjusting device, a humidity adjusting device, and an air velocity adjusting device. Provided that substantially the same result is achieved, the steps of the flowchart need not be in the exact order shown in FIG. 2 and need not be contiguous; that is, other steps can be intermediate. The embodiment of the method of controlling environment thermal comfort level according to the present invention includes the following steps:

Step 100: Start.

Step 110: Determine whether to enter an energy saving mode; when the energy saving mode should not be entered, go to Step 120; otherwise, go to Step 130.

Step 120: Enter the energy saving mode.

Step 130: Determine whether an input control signal is received; when the input control signal is received, then go to Step 140; otherwise, go to Step 200.

Step 140: Generate a target predicted mean vote (PMV) value according to an input signal.

Step 150: Detect a plurality of environment factors of the environment at present to generate a PMV value as a current thermal comfort level detecting value.

Step 160: Obtain a plurality of PMV-EER values respectively corresponding to the environment factor adjusting devices according to a difference value of the target PMV value and the current thermal comfort level detecting value.

Step 170: Determine which one of the environment factor adjusting devices has a greatest PMV-EER value, and choose it to perform an adjusting operation for the thermal comfort level of the environment.

Step 180: Calculate a PMV value of the environment after the adjusting operation is performed to update the current thermal comfort level detecting value.

Step 190: Determine whether a difference value of the current thermal comfort level detecting value and the target PMV value is smaller than a predetermined threshold value; when the difference value of the current thermal comfort level detecting value and the target PMV value is not smaller than the predetermined threshold value, go back to perform Step 160 again; otherwise, go to perform Step 130 again.

Step 200: End.

When the environment factor adjusting devices includes a temperature adjusting device, a humidity adjusting device, and an air velocity adjusting device, the input signal includes a temperature adjusting signal, a humidity adjusting signal, and an air velocity adjusting signal in Step 130, and the environment factors include the temperature, the humidity, and the air velocity in Step 150.

In Step 160, the PMV-EER value is defined as the improvement in the PMV by consumed unit energy, i.e., PMV-EER=$\Delta$PMV/$\Delta$P. Additionally, the predetermined threshold value can be set to be not greater than 0.01 or 0.5, but the above embodiment is only for illustrative purposes and not meant to be a limitation of the present invention.

The PMV-EER calculating method of a cooling equipment is to obtain $\Delta T$ first, and then use EER to calculate a corresponding PMV-EER via the following formula:

$$C_{cap} = \frac{\Delta T \times C_p \times (\rho \times V)}{t}$$

$$\Delta p = \frac{C_{cap}}{EER}$$

t: operating time (hr)
$\Delta T$: temperature variation (° C.)
$C_p$: the specific heat capacity; can be set to 0.2523 (kcal/kg° C.) for air temperatures between $-100°$ C. and $100°$ C.
$\rho$: air density, $\rho=1.184$ kg/m$^3$ at T=25° C., $\rho=1.204$ kg/m$^3$ at T=20° C. for standard atmospheric pressure (760 mmHg)
V: air volume (m$^3$)
$C_{cap}$: cooling capacity (kcal/hr)

The PMV-EER calculating method of a dehumidifier is to get $\Delta h$ first, and then use EER to calculate a corresponding PMV-EER via the formula:

$$H_{cap} = \frac{\Delta h \times (\rho_{w,max} \times V)}{t}$$

$$\Delta p = \frac{H_{cap}}{E.F.}$$

t: operating time (hr)
$\Delta h$: relative humidity variation (%)
$\rho_{w,max}$: saturated humidity (g/m$^3$)
V: air volume (m$^3$)
$H_{cap}$: humidity capacity (g/hr)

The PMV-EER calculating method of a blowing equipment is to get $\Delta h$ first, and then use the EF to calculate a corresponding PMV-EER via the formula:

$$AR_{cap} = \Delta v \times V_a$$

$$\Delta p = FP \times \frac{AR_{cap}}{A_{cap}} \times t$$

t: operating time (hr)
$\Delta v$: air velocity variation (m/s)
$V_a$: air through area (m$^2$)
$A_{cap}$: blowing capacity (m$^3$/s)
$AR_{cap}$: blowing air through area capacity (m$^3$/s)
FP: fan power (kw)

For example, in an environment having a temperature of 30° C. and 80% humidity, when a user inputs a temperature adjusting signal of 25° C. to an air conditioner utilizing the present invention method (wherein the air conditioner includes a temperature adjusting device and a humidity adjusting device), the air conditioner will generate a target PMV value according to the temperature adjusting signal, and detect a plurality of environment factors of the present environment to generate a PMV value as a current thermal comfort level detecting value. Next, the air conditioner will obtain a PMV-EER value of the temperature adjusting device and a PMV-EER value of the humidity adjusting device according to a difference value between the target PMV value and the current thermal comfort level detecting value, and will determine which one of the temperature adjusting device and the humidity adjusting device has the greatest PMV-EER value, and choose it to perform an adjusting operation for the thermal comfort level of the environment. For example, the air conditioner may adjust the temperature to 27° C. first, and then adjust the humidity to 50%, so as to attain substantially the same or a close PMV value compared with the PMV value of 25° C. inputted by the user, and less energy is required to attain the above goal in this way.

Those skilled in the art will readily observe that numerous modifications and alterations of the device and method may be made while retaining the teachings of the invention.

What is claimed is:

1. A method of utilizing an air conditioner to control a thermal comfort level of an environment, the air conditioner including a plurality of environment factor adjusting devices, the method comprising:

determining whether enter an energy saving mode;

when entering the energy saving mode, performing the following step:

(a) generating a target predicted mean vote (PMV) value according to an input signal;

(b) detecting a plurality of environment factors of the environment at present to generate a PMV value as a current thermal comfort level detecting value;

(c) obtaining a plurality of PMV-EER values respectively corresponding to the environment factor adjusting devices according to a difference value between the target PMV value and the current thermal comfort level detecting value;

(d) determining which one of the environment factor adjusting devices has a greatest PMV-EER value, and choosing the environment factor adjusting device having the greatest PMV-EER value to perform an adjusting operation for the thermal comfort level of the environment;

(e) calculating a PMV value of the environment after the adjusting operation is performed to update the current thermal comfort level detecting value;

(f) determining whether a difference value between the current thermal comfort level detecting value and the target PMV value is smaller than a predetermined threshold value; and (g) when the difference value of the current thermal comfort level detecting value and the target PMV value is not smaller than the predetermined threshold value, repeating steps (c), (d), (e), and (f) until the difference value between the current thermal comfort level detecting value and the target PMV value becomes smaller than the predetermined threshold value.

2. The method of claim 1, wherein the environment factor adjusting devices comprise a temperature adjusting device, a humidity adjusting device, and an air velocity adjusting device, and the environment factors comprise temperature, humidity, and air velocity.

3. The method of claim 2, wherein the input signal comprises a temperature adjusting signal, a humidity adjusting signal, and an air velocity adjusting signal.

4. The method of claim 1, further comprising:

(h) when the difference value of the current thermal comfort level detecting value and the target PMV value is smaller than the predetermined threshold value, determining whether there is another input signal received;

(i) when there is another input signal received, repeating steps (a), (b), (c), (d), (e), and (f); and (j) when there is no other input signal received, ending operation of controlling thermal comfort level of the environment.

5. The method of claim 1, wherein the predetermined threshold value is not greater than 0.01.

6. The method of claim 1, wherein the predetermined threshold value is not greater than 0.5.

* * * * *